(12) United States Patent
Grenon

(10) Patent No.: US 8,727,739 B2
(45) Date of Patent: May 20, 2014

(54) HEATING PUMP FOR LIQUIDS

(75) Inventor: Vincent Grenon, Riddes (CH)

(73) Assignee: Gotec SA, Sion (CH)

( * ) Notice: Subject to any disclaimer, the term of this patent is extended or adjusted under 35 U.S.C. 154(b) by 158 days.

(21) Appl. No.: 12/832,325

(22) Filed: Jul. 8, 2010

(65) Prior Publication Data

US 2010/0272582 A1 Oct. 28, 2010

Related U.S. Application Data

(63) Continuation of application No. PCT/EP2009/050191, filed on Jan. 8, 2009.

(30) Foreign Application Priority Data

Jan. 9, 2008 (CH) .................................... 0025/08

(51) Int. Cl.
*F04B 19/24* (2006.01)
*F04F 1/18* (2006.01)

(52) U.S. Cl.
USPC ........................................................ 417/207

(58) Field of Classification Search
USPC .................. 417/53, 207; 222/146.5; 219/201
See application file for complete search history.

(56) References Cited

U.S. PATENT DOCUMENTS

| | | | |
|---|---|---|---|
| 2,654,505 A | 10/1953 | Fuhrman | |
| 5,477,675 A | 12/1995 | Ingraham et al. | |
| 5,789,915 A * | 8/1998 | Ingraham | 324/207.2 |
| 5,915,593 A * | 6/1999 | Bancon | 222/41 |
| 6,244,838 B1 * | 6/2001 | Couillard et al. | 417/426 |
| 6,311,868 B1 * | 11/2001 | Krietemeier et al. | 222/1 |
| 2005/0007406 A1 * | 1/2005 | Haas et al. | 347/17 |
| 2005/0183578 A1 * | 8/2005 | Mandralis et al. | 99/279 |
| 2005/0284302 A1 * | 12/2005 | Levin | 99/275 |

FOREIGN PATENT DOCUMENTS

| | | |
|---|---|---|
| DE | 19852092 A1 | 5/2000 |
| EP | 0496939 A1 | 8/1992 |
| EP | 0592943 A1 | 4/1994 |
| EP | 1097663 A1 | 5/2001 |
| EP | 1380243 A1 | 1/2004 |
| FR | 2012636 | 3/1970 |
| FR | 2780262 | 12/1999 |
| GB | 2153190 A | 8/1985 |
| GB | 2347058 A | 8/2000 |

OTHER PUBLICATIONS

International Search Report for PCT/EP2009/050191, dated Apr. 27, 2009.

* cited by examiner

*Primary Examiner* — Charles Freay
*Assistant Examiner* — Amene Bayou
(74) *Attorney, Agent, or Firm* — Pearne & Gordon LLP

(57) ABSTRACT

A liquid pump that includes a cylinder (2), an inlet valve (4) for feeding liquid into the cylinder, and a discharge valve (5) for discharging the liquid out of the cylinder. The liquid pump also includes a piston (3) sliding in said cylinder so as to draw said liquid into said cylinder and to expel the same outside the cylinder. Additionally, the liquid pump includes an electric circuit (7) for heating the cylinder, with at least one resistor (70, 71) for electrically heating the liquid in the cylinder. The resistor (70, 71) may be made in the form of an electrically conducting thin track deposited on or in the wall (20) of the cylinder (2). The heating may be initiated before the introduction of the liquid into the cylinder, and interrupted before the full discharge of the liquid out of the cylinder.

22 Claims, 3 Drawing Sheets

US 8,727,739 B2

HEATING PUMP FOR LIQUIDS

RELATED APPLICATIONS

This application is a continuation of international application PCT/EP2009/050191, filed on Jan. 8, 2009 and claiming priority of Swiss Patent Application CH2008/00025, filed on Jan. 9, 2008.

TECHNICAL FIELD

The present invention concerns a positive-displacement liquid pump including a heating element. A particular application for this pump relates to heating to a given temperature a precise dose of liquid, for example in a hot drinks dispenser.

STATE OF THE ART

Many examples of liquid pumps operating according to different principles are known. There are also different types of water heating devices. Many coffee machines use a tank in which the water is preheated before being pumped through the coffee powder then poured into the cups. These devices require to preheat a volume of water greater than what will be finally used, which causes a waste of energy. When conversely a volume of coffee greater than the tank's capacity is required, it is necessary to wait after the water has been filled until the newly filled water has been heated.

One also knows continuous liquid heating devices in which the water is heated when it passes through a tube or pipe. Such devices are described for example in patent application EP-A1-1380243 (Nestec SA) which illustrates a liquid heating module comprising a hollow tube provided with at least two heating resistors, for example conductor wires or inks deposited onto a substrate. A similar solution is also described in EP-A1-1097663.

The prior art solutions generally require a pump to circulate the water in a heating tube or a thermoblock, and a flowmeter for controlling the quantity of water supplied. The complete device thus includes many distinct discrete parts that are complex to combine and whose assembly requires a considerable volume. Furthermore, the water temperature depends both on the electric current in the heating module and on the water flow in the tube, which requires a rather complex control.

Patent application FR2780262 describes a coffee machine having a hollow piston pump actuated by an electromagnetic motor. The hollow piston through which the liquid passes is difficult to clean; furthermore, it does not allow a constant water volume to be displaced at each actuating. A flowmeter is thus required, formed in this case of an idle wheel with fins that is put in rotation by the flow of liquid.

Other examples of hot drinks dispensers including a piston pump are described in the U.S. Pat. No. 2,654,505 and FR2012636.

Patent application EP-A1-496939 describes another pump for a coffee machine comprising a piston sliding in a cylinder actuated by a motor and an actuator. The piston's run, which determines the volume of liquid aspired then rejected in the cylinder, is controlled by means of micro-connectors or of an encoder connected to the motor. The signals from the microswitches or from the encoder are processed by an electronics that generates control signals for the motor. The volume of water in the cylinder is heated by means of a resistive wire coiled around the outer surface of the cylinder and through which runs an electric current.

This arrangement enables the liquid to be heated directly inside the pump, so that an additional heating tube is not required. Furthermore, using a piston pump makes it possible to easily control the volume of aspired liquid, simply by modifying the piston's run. However, the time necessary for obtaining a cup of hot coffee is considerable, for several reasons:

First, the tube is heated by means of a discrete wire coiled around the cylinder. Only part of the heat emitted by the wire is transmitted to the cylinder and then to the liquid; the remainder is dissipated into the air. The heat resistance between the wire and the cylinder is in fact considerable unless costly measures, for example use of an electric conductor paste, are implemented.

Furthermore, heating the cylinder starts only when the latter is full of liquid. The considerable thermal inertia of the heater wire and cylinder slows the heat transmission and increases the time required for heating the aspired liquid volume of liquid. This inertia further makes it difficult to maintain a constant liquid temperature; the reaction lag of the system is too great, notably when external conditions change, for example when the liquid is evacuated. Furthermore, because of the considerable thermal inertia and the thermal resistance between the wire and the cylinder, the system remains hot for a relatively long period of time, even when the electric current is interrupted.

Finally, the resistor's heat is transmitted on the entire length of the cylinder, even when a small quantity of liquid needs to be heated for an espresso for example. The spires of the resistor above the piston, in the liquid-free zone, supply heat that is hardly used and that is transmitted to the environment at full loss. If the waste of electric current that results could possibly be tolerated in an installation powered by mains electricity, the same does not apply in the case of a machine designed to be powered by an autonomous power source, for example a car battery.

BRIEF SUMMARY OF THE INVENTION

One aim of the present invention is to propose a liquid pump free from the limitations of the pumps described in the above-mentioned documents. In particular, one aim is to propose a pump allowing a controlled volume of liquid to be transferred and heated quickly by means of a device that is compact and easy to manufacture and assemble.

It has been discovered within the frame of this invention that the quality of a coffee depends strongly on the temperature of the water passing through the powder; a precisely controlled and constant temperature during the entire through-flow through the powder makes it possible to improve considerably the quality of the coffee obtained. Indeed, a temperature too low does not allow the water to carry all the coffee flavors, whilst a temperature too high burns some flavors or even produces steam bubbles that simply pass through the coffee powder without capturing any taste. Another aim of the invention is thus to propose a device enabling a controlled volume of water, at a controlled through-flow speed and with a constant temperature during the entire through-flow to be supplied.

According to the invention, these aims are achieved notably by means of a liquid pump having the characteristics of the main claim and with the aid of a method having the characteristics of the independent method claim. Preferred, though not essential, embodiments are indicated in the dependent claims and in the description.

BRIEF DESCRIPTION OF THE FIGURES

Examples of embodiments of the invention are indicated in the description illustrated by the attached figures, wherein.

EXAMPLE(S) OF EMBODIMENTS OF THE INVENTION

Figure 1:
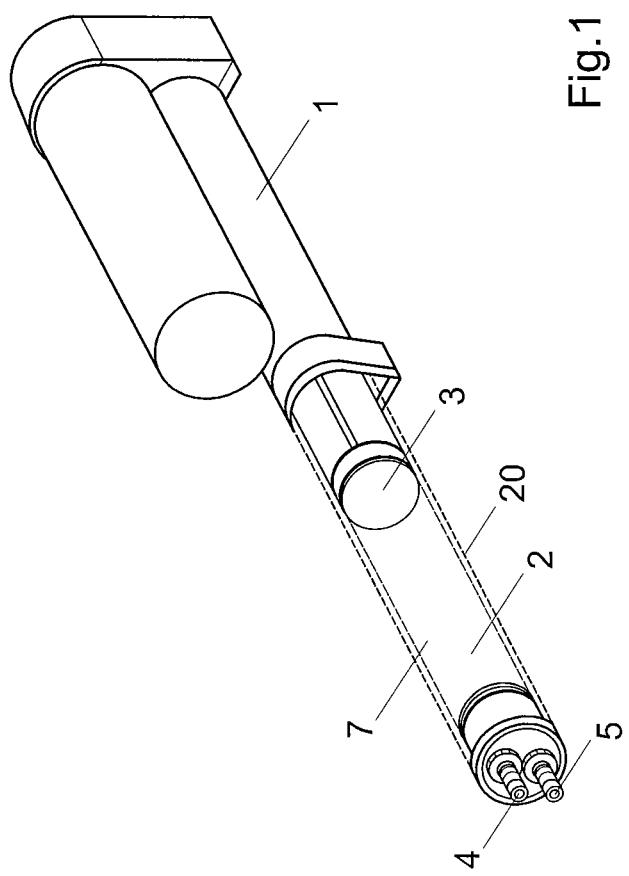
FIG. 1 illustrates a perspective view of a pump according to the invention.
Figure 2:
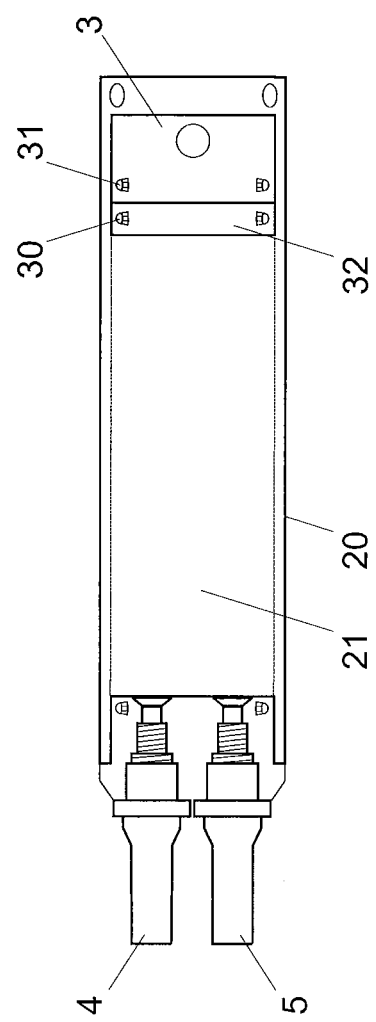
FIG. 2 illustrates a cross-sectional view of a pump according to the invention, represented without the motor element.
Figure 3:
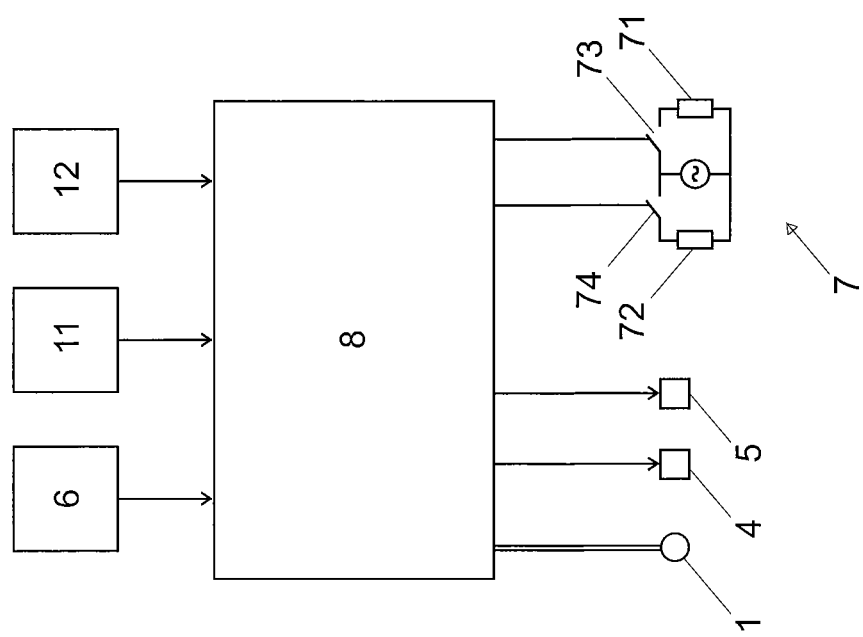
FIG. 3 is a bloc diagram of the system.

An example of a pump according to the invention is illustrated in FIG. 1. The pump comprises a cylinder 2 of cylindrical section in this non-limiting example. A piston 3 can preferably slide inside the cylinder, being moved by a motor element 1. A liquid coming from a tank, not represented, or a source of liquid, not represented, can be fed into the cylinder's inner volume through an inlet valve 4 or be discharged from this volume through a discharge valve 5. The valves 4 and 5 can be controlled electromagnetically by actuators, mechanically by the movements of the piston, or opened and closed automatically depending on the differences of pressure between the inside and the outside of the cylinder.

The motor 1 is preferably an electric linear actuator capable of moving alternatively in one direction and then in the other when an electric current is supplied. According to a preferred embodiment of the invention, the motor can be powered at 12 or 24 volts or at a lower tension, which enables it to be used in a car with the current produced by the battery. Other continuous or alternative voltage sources are also conceivable within the frame of the invention. Rotating motors with a worm, cam, rod or synchronous belt system to convert the rotation into a translation, or pneumatic actuators, can also be used.

In a preferred embodiment, the piston's run can be controlled in order to vary the quantity of liquid drawn by the valve 4 and then expelled through the valve 5. The run is preferably controlled by a micro-controller by modifying the length of time during which the motor 1 is powered. The control can be performed in open circuit, i.e. by applying an impulse length that depends only on the setting value chosen for the run and the volume, or preferably in closed circuit with a feedback loop taking into account a measurement value supplied by a position sensor 6. The position sensor can include for example one or several Hall sensors, or an encoder, connected to the mobile arbor of the motor 1.

The piston includes a piston head provided in this example with two peripheral joints 30, 31 engaged each in an annular gorge at the periphery of the piston head. The joints 30, 31 are for example o-ring joints and are slightly compressed against the cylinder's inner face. A lubricant 32, for example a compatible edible fat, is confined between the two joints, the outer surface of the piston and the inner face of the cylinder in order to lubricate the piston and facilitate its movements.

The cylinder is preferably made of metal, for example of stainless steel or of another good heat conductor material. Its outer faces are at least partially covered with electric tracks 71, 72 . . . that are part of an electric heating circuit 7; the tracks have an electric resistor that enables heat to be produced when a current passes through them. In a preferred embodiment, the tracks 71, 72 are constituted of electrically conducting ink deposited in thin layers by screen printing (serigraphy) or by another printing process on the outer surface 20 of the cylinder 2. It has indeed surprisingly been observed that this method allows layers to be printed that are sufficiently thick and resistant so as not to be destroyed by the considerable currents necessary for heating the water—even if the supply voltage is reduced, for example at continuous 12V or 24V.

The electric circuit constituted by the tracks preferably comprises several branches 71 resp. 72 connected in parallel, which makes it possible to reduce the current in each branch. Electric switches 73 resp. 74, for example transistors, integrated circuits or relays, make it possible to modify the circuit's configuration and to control the branches that are powered and that contribute to heating the cylinder and the liquid in the cylinder. These switches can be provided on the cylinder's surface or more easily in the electronic circuit that supplies the current to the different branches of the circuit.

In a preferred embodiment, the electric heating circuit 7 has at least two branches 71, 72 that occupy or cover distinct longitudinal portions of the cylinder. It is thus possible to select the longitudinal portion of the cylinder that is heated at each instant by selecting the branches 71 or 71+72 that are supplied with current. The number of branches that will be supplied with current depends on the quantity of volume to be heated, so as to avoid large portions of the cylinder beyond the upper limit of the piston's run. In one embodiment, only the lower half of the cylinder is heated with the branch 71 when half a volume of the cylinder of hot water is to be produced. The number of heating tracks 71, 72 can be greater than two.

The choice of the number of branches supplied with current can also depend on the liquid's desired temperature. Generally, the heating power and thus the time necessary to obtain a given liquid temperature can be controlled by acting on one or several of the following parameters:

Number of branches 71, 72 of the circuit supplied with current.

Connection of the branches to one another (in series, parallel etc.).

Duration of the current in the different branches 71, 72; it is possible to power some branches for a longer period or differently from the others.

Intensity of the current in each branch or modulation of this intensity as a function of time.

The choice of the parameter or parameters above depends on the volume of liquid to be heated and the setting temperature entered with a control circuit 12 and possibly on the initial temperature of the cylinder if it is known. A temperature sensor 11 can furthermore be used for measuring the temperature of the liquid or of a part in contact with the liquid so as to interrupt or modify the electric current depending on the measured temperature.

The different branches of the circuit 71, 72 do not necessarily have all the same length, the same thickness, the same width and/or the same electric resistance.

In an advantageous embodiment, the liquid pressure expelled out of the cylinder is also controlled by means of a monitoring loop in order to use a pressure of the liquid through the beverage powder adapted to the type of desired beverage. In fact, the pressure of the liquid influences directly the quality of the coffee or of the beverage. To this effect, the inventive device advantageously includes a pressure detector downstream of the cylinder, supplying a measurement value used by a regulating circuit to control the current applied to the piston translation system and thus obtain a constant liquid pressure during evacuation and close to the setting value depending on the desired beverage.

The heating element with thin layers can be replaced by a resistor of the type Egotherm (registered trademark) or other similar heating systems having heating elements coiled and soldered around the outer surface of a cylinder. In a variant embodiment, the heating element is replaced or complemented with a cooling element, for example of the Peltier type, in order to lower the temperature of a liquid entering preheated into the pump.

The device described here above can furthermore be modified by using two pistons or more working advantageously in phase-shifted manner to transfer and heat several times controlled quantities of liquid. This enables a hot liquid to be supplied continuously without dead center when the piston fills. Furthermore, by modifying the number of pistons actually used, it is possible to control the volume of liquid that is heated and transferred. The number of pistons used can be modified with the aid of numeric commands to control the valves that must be opened or closed during each cycle and possibly the pistons that are to be displaced. The different pistons can be driven by the same motor or actuator or by individual actuators. It is also possible to use double-acting pistons that draw and push back the liquid continuously in order to reduce the draught time.

The method implemented to produce a desired quantity of hot liquid will now be described. In a first step, at least one electric switch (for example 73 or 73+74) is open in order to have an electric current circulate in one of the conductor tracks 71, 72 on the outer surface 20 of the cylinder, so as to preheat this cylinder. The heat produced by the thin resistive layers is immediately transmitted to the corresponding portion of the walls of the cylinder 2. Simultaneously, or shortly before or after, the inlet valve 4 is opened whilst the discharge valve 5 is closed, for example electromechanically under the control of an electronic control circuit, or mechanically, for example by means of springs.

The piston 3 is then raised under the action of the motor 1 so as to draw the liquid into the cylinder 2 and through the inlet valve 4. The process of heating the cylinder is preferably continued during aspiration. The run of the piston 3 is preferably regulated so as to correspond to the volume of liquid to be produced by means of the open loop control or closed feedback loop mentioned previously.

When the piston 3 arrives at the end of its run or at the height corresponding to the desired volume of liquid, it is preferably maintained at this position during the length of time necessary for heating the liquid to the desired temperature. This duration can be determined depending on the volume of liquid or preferably interrupted when the temperature sensor 11 indicates that the liquid has reached the desired temperature, for example 94° C. for coffee. The electric current injected into the circuit as well as the number of branches through which a current passes can be regulated depending on the volume of liquid to be heated and/or the setting temperature to be reached. The inlet valve 4 is preferably closed as soon as the piston has reached its maximum height, in order to prevent the heated liquid from exiting through the inlet channel or the heat from escaping by convection from the liquid mixture.

The discharge valve 5 is then opened and the piston 3 lowered so as to expel the heated liquid. The process of heating the cylinder can be maintained and regulated during this expulsion phase so as to guarantee a constant liquid temperature throughout the expulsion. In a preferred embodiment, heating is interrupted or at least reduced by diminishing the electric current before the liquid has been completely expelled out of the cylinder. This allows the cylinder's thermal inertia to be used and one avoids transmitting heat to the cylinder that will not have time to be communicated to the liquid. The interruption or quick reduction of the heating further makes it possible to avoid too great temperature differences between the last expelled drops of liquid and those that first leave the cylinder, which enables for example the production of useless steam by evaporation of the last drops of liquid to be avoided. It is thus also possible to modify the electric connections of the heating circuit when the piston moves and for example to interrupt more quickly the supply to the printed tracks that cover the upper part of the emptied cylinder first.

An electronic circuit 8, for example a microcontroller controlled by a computer program of an FPGA circuit preferably controls the following events:
  Opening and closing of the valves 4, 5.
  Powering the motor 1 so as to cause the piston to be displaced in one direction or the other.
  Controlling the different tracks 71, 72 . . . of the heating circuit 7.
  Taking into account the signals supplied by the piston's position sensors 6, by the optional temperature sensor 11 and by a control circuit 12 for entering setting values for the volume to be heated and/or the temperature to be reached.

In the embodiments described further above, the liquid is heated in the cylinder. It is however also possible to draw and transfer a liquid with the pump described without heating it, for example by controlling the heating element so as to not circulate any current therein or by providing a pump without heating element.

The inventive device and method can be used for example for a hot drinks dispenser, notably a coffee machine, including a coffee machine for a car or trailer or camper van or all electrically autonomous vehicles such as airplanes, taxis, trains, ships etc. A similar pump can also be used for dosing heated liquid, in the food industry, for gluing with heated glue, for evacuating condensates etc.

The invention claimed is:

1. A liquid pump comprising:
  a cylinder;
  an inlet valve for feeding the liquid into the cylinder;
  a discharge valve for discharging the liquid out of the cylinder;
  a piston sliding in said cylinder so as to draw said liquid into said cylinder and to expel the same outside the cylinder;
  an electric circuit for heating the cylinder,
  wherein said electric circuit has two or more branches,
  wherein said two or more branches each has at least one resistor for electrically heating the liquid in the cylinder,
  wherein said resistor is made in the form of an electrically conducting thin track located on or in the wall of the cylinder,
  wherein said branches occupy different longitudinal portions along said cylinder in order to control the longitudinal portions of the cylinder heated by selecting the branches through which a current passes, and
  wherein a control circuit is configured to select at least one of the branches to supply with current and simultaneously to select not to supply current to at least another of the branches, depending on a temperature and/or a volume of the liquid in the cylinder.

2. The pump of claim 1, wherein said electric circuit further comprises:
  switches that select the branches that are supplied with current, wherein the branches are controlled by the control circuit.

3. The pump of claim 2, wherein several of the branches occupy the same longitudinal portion along said cylinder, wherein the number of the branches selected depend on a desired pre-set temperature of the liquid to be heated.

4. The pump of claim 1, including a temperature sensor for measuring the liquid's temperature and the control circuit arranged to interrupt the heating of the liquid and to begin the expulsion of the liquid out of the cylinder as soon as the liquid's temperature has reached a predetermined setting temperature.

5. The pump of claim 4, said control circuit being arranged for measuring the liquid temperature during expulsion and for controlling the electric current in said circuit so as to guarantee a constant liquid temperature during expulsion.

6. The pump of claim 1, wherein said thin track is constituted by at least one layer of electrically conducting ink located on the outer wall of the cylinder.

7. The pump of claim 1, further comprising: at least one Hall sensor to detect the longitudinal position of the piston and set the volume of liquid to be heated.

8. The pump of claim 1, wherein said piston is actuated by an electric motor, the piston's run being adjustable depending on the volume of heated liquid to be produced.

9. The pump of claim 1, said piston being actuated by a linear actuator.

10. The pump of claim 1, said piston having two ring joints on its periphery, edible fat being confined between said piston, the inner face of said cylinder and said joints.

11. The pump of claim 1, having several phase-shifted pistons.

12. The pump of claim 1, having at least one double-acting piston.

13. The pump of claim 1, having a pressure sensor and the control circuit arranged so as to control the pressure of the liquid at the exit of the cylinder.

14. The pump of claim 1, having a Peltier element for cooling the liquid in the cylinder.

15. The pump of claim 1, having an electric motor powered at 12V or 24V.

16. The pump of claim 1, the liquid pump further comprising:
a position sensor for detecting a volume of liquid inside of the cylinder; and
the control circuit configured to select different branches through which the current passes depending on the volume of the liquid detected by the position sensor.

17. The pump of claim 16, wherein the control circuit selects at least one of the branches to supply with current and selects not to supply current to at least another of the branches based on the volume of the liquid being less than half of the volume of the cylinder, and
wherein the control circuit selects at least two branches to supply with current based on the volume of the liquid being more than half of the volume of the cylinder.

18. The liquid pump of claim 16, wherein the position sensor detects the longitudinal position of the piston which corresponds to the volume of liquid inside the cylinder.

19. A method for supplying a determined volume of heated liquid, including the following steps:
controlling at least one electric switch with a control circuit in order to have an electric current circulate in at least one resistor of an electric heating circuit, the heat produced by the electric heating circuit being transmitted to the walls of a cylinder, the electric circuit that includes the at least one resistor being in the form of an electrically conducting thin track deposited on or in the wall of the cylinder;
controlling at least another electric switch with the control circuit in order to prevent an electric current from circulating in at least one resistor of an another electric heating circuit located on or in the wall of the cylinder,
wherein the control circuit is configured to have electric current circulate in the at least one resistor of the electric heating circuit and simultaneously to prevent an electric current from circulating in at least one resistor of the another electric heating circuit based on a temperature and/or a volume of liquid in the cylinder;
opening a liquid inlet valve for enabling the liquid to be fed into said cylinder;
longitudinally displacing in a first direction a piston in said cylinder so as to draw said volume of liquid into said cylinder; and
determining the volume of liquid in the cylinder to be heated with a position sensor,
wherein a run of the piston is controlled so as to depend on said volume, and
wherein said electric heating circuit and said another electric heating circuit are controlled so as to adapt the electric current and/or the connection of the electric heating circuit depending on said volume, closing said inlet valve and opening a discharge valve, longitudinally displacing in a second direction opposite to the first direction said piston in said cylinder so as to expel the heated liquid outside the cylinder.

20. The method of claim 19, including a step of selecting a longitudinal portion of the cylinder heated depending on the volume of liquid to be heated.

21. The method of claim 19, wherein the electric current in the at least one resistor is interrupted before the liquid is expelled and as soon as the liquid has reached a predetermined setting temperature.

22. A method for supplying a determined volume of heated liquid, including the following steps:
controlling at least one branch of an electric circuit with a control circuit in order to have an electric current circulate in at least one resistor of an electric heating circuit, the heat produced by the electric heating circuit being transmitted to the walls of a cylinder, the electric circuit including the at least one resistor in the form of an electrically conducting thin track deposited on or in the wall of the cylinder;
controlling at least another branch of an electric circuit with the control circuit in order to prevent an electric current from circulating in at least one resistor of another electric heating circuit,
wherein the control circuit is configured to have electric current circulate in the at least one resistor of the electric heating circuit and simultaneously to prevent an electric current from circulating in at least one resistor of the another electric heating circuit based on a temperature and/or a volume of liquid in the cylinder;
opening a liquid inlet valve for enabling the liquid to be fed into said cylinder;
longitudinally displacing in a first direction a piston in said cylinder so as to draw said volume of liquid into said cylinder;
determining the volume of liquid in the cylinder to be heated with a position sensor;
closing said inlet valve and opening a discharge valve; and
longitudinally displacing in a second direction opposite to the first direction said piston in said cylinder so as to expel the heated liquid outside the cylinder,
wherein the electric current in the at least one resistor is interrupted before the liquid is expelled and as soon as the liquid has reached a predetermined setting temperature.

* * * * *